US011264629B2

(12) United States Patent
Lee et al.

(10) Patent No.: US 11,264,629 B2
(45) Date of Patent: Mar. 1, 2022

(54) METHOD FOR MANUFACTURING MEMBRANE-ELECTRODE ASSEMBLY

(71) Applicants: Hyundai Motor Company, Seoul (KR); Kia Motors Corporation, Seoul (KR)

(72) Inventors: Woo Jin Lee, Seoul (KR); Ki Sub Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 100 days.

(21) Appl. No.: 16/878,900

(22) Filed: May 20, 2020

(65) Prior Publication Data

US 2021/0202970 A1 Jul. 1, 2021

(30) Foreign Application Priority Data

Dec. 31, 2019 (KR) .......................... 10-2019-0178870

(51) Int. Cl.
*H01M 8/1004* (2016.01)
*H01M 8/0276* (2016.01)
*H01M 8/0286* (2016.01)
*H01M 8/10* (2016.01)

(52) U.S. Cl.
CPC ....... *H01M 8/1004* (2013.01); *H01M 8/0276* (2013.01); *H01M 8/0286* (2013.01); *H01M 2008/1095* (2013.01)

(58) Field of Classification Search
None
See application file for complete search history.

(56) References Cited

U.S. PATENT DOCUMENTS

2008/0145712 A1* 6/2008 Pierpont ............. H01M 8/0273
429/509
2011/0151350 A1* 6/2011 Iverson ............... H01M 8/0273
429/480

FOREIGN PATENT DOCUMENTS

| JP | 2013-515348 A | 5/2013 |
|----|---------------|--------|
| JP | 5324465 B2 | 10/2013 |
| KR | 100366606 B1 | 1/2003 |
| KR | 2013-0003560 A | 1/2013 |
| KR | 101575312 B1 | 12/2015 |
| KR | 101745114 B1 | 6/2017 |

* cited by examiner

*Primary Examiner* — Alix E Eggerding
(74) *Attorney, Agent, or Firm* — Mintz Levin Cohn Ferris Glovsky and Popeo, P.C.; Peter F. Corless

(57) ABSTRACT

A method for manufacturing a membrane-electrode assembly (MEA) is provided. In particular, first and second sub-gasket sheets are continuously supplied and an electrode membrane sheet having gaps formed therein so that the amount of an electrolyte membrane used is reduced is discontinuously supplied. Thus, the minimum length of the electrolyte membrane protrudes between sub-gaskets and the electrolyte membrane together with electrode catalyst layers is bonded to the sub-gaskets

12 Claims, 10 Drawing Sheets

METHOD FOR MANUFACTURING MEMBRANE-ELECTRODE ASSEMBLY

CROSS-REFERENCE TO RELATED APPLICATION

This application claims under 35 U.S.C. § 119(a) the benefit of priority to Korean Patent Application No. 10-2019-0178870 filed on Dec. 31, 2019, the entire contents of which are incorporated herein by reference.

BACKGROUND

(a) Technical Field

The present disclosure relates to a method for manufacturing a membrane-electrode assembly, and more particularly, to a method for manufacturing a membrane-electrode assembly that reduces use of a polymer electrolyte membrane.

(b) Background Art

A fuel cell produces electricity through electrochemical reaction between hydrogen and oxygen. Such a fuel cell may receive chemical reactants from the outside without a separate charging process and thus consistently generate electricity. The fuel cell may be configured such that separators (or bipolar plates) are disposed at both sides of a membrane-electrode assembly (MEA). These fuel cells are arranged continuously arranged, thus forming a fuel cell stack.

FIG. 1 is a cross-sectional view schematically illustrating one example of a general membrane-electrode assembly according to the related art. Referring to FIG. 1, one exemplary membrane-electrode assembly 1 corresponding to a principal element of a fuel cell includes electrode catalyst layers 5 disposed on both surfaces of an electrolyte membrane 3, to which proton is moved, to form an anode and a cathode. Further, the membrane-electrode assembly 1 includes sub-gaskets 7 which protect the electrode catalyst layers 5 and the electrolyte membrane 3 and ensure assimilability of the fuel cell.

As the manufacturing process of the above membrane-electrode assembly 1, first, an electrode membrane sheet 6 is manufactured using a decal method in which the electrolyte membrane 3, wound into a roll, is unwound, and the electrode catalyst layers 5 are continuously transferred onto both surfaces of the electrolyte membrane 3 to be spaced apart from each other by a particular distance.

Thereafter, as post-processing, a membrane-electrode assembly sheet is manufactured using a roll-to-roll method in which the electrode membrane sheet 6, wound into a roll, is unwound and conveyed, the sub-gaskets 7 wound into rolls are unwound and disposed on both surfaces of the electrode membrane sheet 6, and then the electrode membrane sheet 6 having the sub-gaskets 7 provided on both surfaces thereof passes between hot rollers to bond the sub-gaskets 7 to both surfaces of the electrode membrane sheet 6.

Particularly, the sub-gaskets 7 in a state in which electrode windows for opening the electrode catalyst layers 5 and manifold windows are formed by cutting may be supplied to both surfaces of the electrode membrane sheet 6, and then be bonded to the surfaces of the electrode membrane sheet 6. After such a process, by unwinding the membrane-electrode assembly sheet wound into a roll and then cutting the membrane-electrode assembly sheet into units including the electrode catalyst layers 5, the membrane-electrode assembly 1 shown in FIG. 1 may be manufactured.

In the conventional membrane-electrode assembly 1 manufactured by the above-described method, as the electrode membrane sheet 6, in which the electrode catalyst layers 5 are continuously formed on both surfaces of the electrolyte membrane 3, is prepared and the sub-gaskets 7 are bonded to both surfaces of the electrode membrane sheet 6, the electrolyte membrane 3 is disposed in all regions between the sub-gaskets 7.

Development of the sub-gaskets 7 used in the membrane-electrode assembly 1 merely tends to prevent leakage of reaction gas or relates to cell output performance, and effects of mechanical durability of the membrane-electrode assembly 1 and the electrolyte membrane 3 have not been known yet. Therefore, in the conventional membrane-electrode assembly 1, the sub-gaskets 7 are bonded to outer regions of the electrode catalyst layers 5 which do not generate electricity, i.e., non-electricity-generating regions, with the electrolyte membrane 3 interposed therebetween, and thus, the electrolyte membrane 3 is present in the non-electricity-generating regions.

Accordingly, the electrolyte membrane 3 which merely supports the sub-gaskets 7 is present in the non-electricity-generating regions of the conventional membrane-electrode assembly 1, thus wasting a comparatively expensive electrolyte membrane material and increasing manufacturing costs of the membrane-electrode assembly 1.

The above description has been provided to increase understanding of the background of the present disclosure and should not be interpreted as conventional technology known to those skilled in the art.

SUMMARY

The present disclosure provides a method for manufacturing a membrane-electrode assembly in which first and second sub-gasket sheets are continuously supplied (using a roll-to-roll method) and an electrode membrane sheet having gaps formed therein to reduce the amount of an electrolyte membrane used is discontinuously supplied (using a stop-go method), thereby reducing use of the electrolyte membrane.

In one aspect, the present disclosure provides a method for manufacturing a membrane-electrode assembly (MEA) that may include unwinding and supplying first and second sub-gasket sheets wound into rolls, continuously forming electrode windows in the supplied first and second sub-gasket sheets using first and second sub-gasket cutters to space the electrode windows apart from one another by a predetermined interval, continuously supplying the first and second sub-gasket sheets provided with the electrode windows continuously formed therein to first and second sub-gasket sheet bonding rollers, unwinding and supplying an electrode membrane sheet wound into a roll, continuously forming gaps in the supplied electrode membrane sheet using an electrode membrane cutter to space the gaps apart from one another by a predetermined interval, and supplying the electrode membrane sheet provided with the gaps formed therein to an electrode membrane sheet bonding roller.

Additionally, the method may include primarily bonding the supplied first sub-gasket sheet and the supplied electrode membrane sheet by allowing the first sub-gasket sheet and the electrode membrane sheet to pass between the first sub-gasket sheet bonding roller and the electrode membrane sheet bonding roller, and secondarily bonding a second assembly, supplied from the first sub-gasket sheet bonding roller after the primarily bonding, and the second sub-gasket sheet supplied from the second sub-gasket sheet bonding roller by allowing the second assembly and the second sub-gasket sheet to pass between the first sub-gasket sheet bonding roller and the second sub-gasket sheet bonding roller.

In an exemplary embodiment, the method may further include thirdly bonding a second assembly, supplied from the first and second sub-gasket sheet rollers after the secondarily bonding, by allowing the second assembly to pass between step-preventive reinforced bonding rollers. In addition, the electrode membrane sheet may include an electrolyte membrane, electrode catalyst layers formed on central portions of one surface and a remaining surface of the electrolyte membrane, and a protective film disposed on an outer surface of one of the electrode catalyst layers.

The protective film may be removed after the primarily bonding. The continuously forming of the gaps may include separating some portions of the electrolyte membrane of the electrode membrane sheet to form the gaps by performing a punching process using punching rollers included in the electrode membrane cutter, removing the separated portions of the electrolyte membrane, and collecting the removed portions of the electrolyte membrane.

Further, a punching plate included in the punching rollers may have a depth of about 15-250 μm and the gaps may have a size of about 2-34 mm. The electrode membrane sheet provided with the gaps formed therein may be supplied to the electrode membrane sheet bonding roller via a pair of buffer rollers, prior to the primarily bonding.

In an exemplary embodiment, in the supplying of the electrode membrane sheet to the electrode membrane sheet bonding roller, the electrode membrane sheet may be discontinuously supplied to the electrode membrane sheet bonding roller only when the primarily bonding is performed in a state in which the electrode membrane sheet contacts the electrode window of the first sub-gasket sheet. The electrode membrane sheet bonding roller may be operated for the electrode membrane sheet bonding roller to perform rotational motion at a contact point at which the electrode membrane sheet contacts the first sub-gasket sheet bonding roller, and then perform linear motion at a point at which the electrode membrane sheet does not contact the first sub-gasket sheet bonding roller.

Further, the electrode membrane sheet bonding roller and the first sub-gasket sheet bonding roller may be disposed at positions such that an angle formed by a straight line including the contact point at which the rotational motion is performed and a straight line on a path of the linear motion is less than 90°. A weight of the electrode membrane sheet bonding roller may be lighter than a weight of the first sub-gasket sheet bonding roller.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
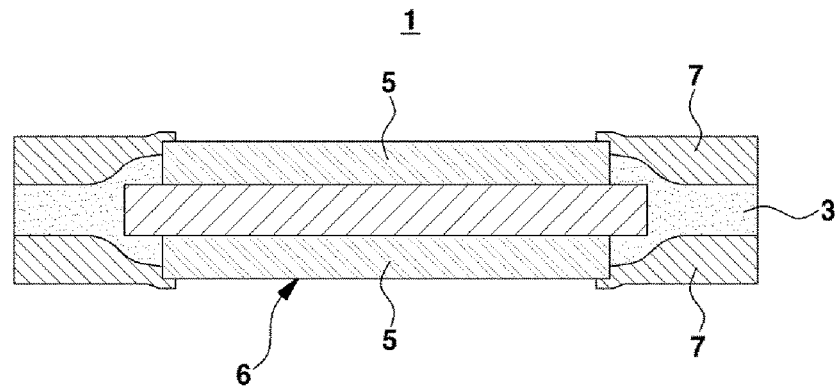
FIG. 1 is a cross-sectional view schematically illustrating one example of a general membrane-electrode assembly (MEA) according to the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment. In the figures, reference numbers refer to the same or equivalent parts of the present disclosure throughout the several figures of the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will be made in detail to various exemplary embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other exemplary embodiments within the spirit and scope of the disclosure as defined by the appended claims.

In the following description of the exemplary embodiments, the same elements are denoted by the same reference numerals even though they are depicted in different drawings. In the drawings, the dimensions of structures are exaggerated compared to the actual dimensions thereof for clarity of description. In the following description of the embodiments, terms, such as "first", "second", etc., may be used to describe various elements but do not limit the elements. These terms are used only to distinguish one element from other elements. For example, a first element may be named a second element, and similarly, a second element may be named a first element within the spirit and scope of the disclosure. Singular expressions may encompass plural expressions unless they have clearly different contextual meanings In the following description of the exemplary embodiments, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

In the following description of the exemplary embodiments, it will be understood that, when the range of a variable is stated, the variable includes all values within the stated range including stated end points of the range. For example, it will be understood that a range of "5 to 10" includes not only values of 5, 6, 7, 8, 9 and 10 but also arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Further, for example, it will be understood that a range of "10% to 30%" includes not only all integers including values of 10%, 11%, 12%, 13%, . . . 30% but also arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Figure 2:
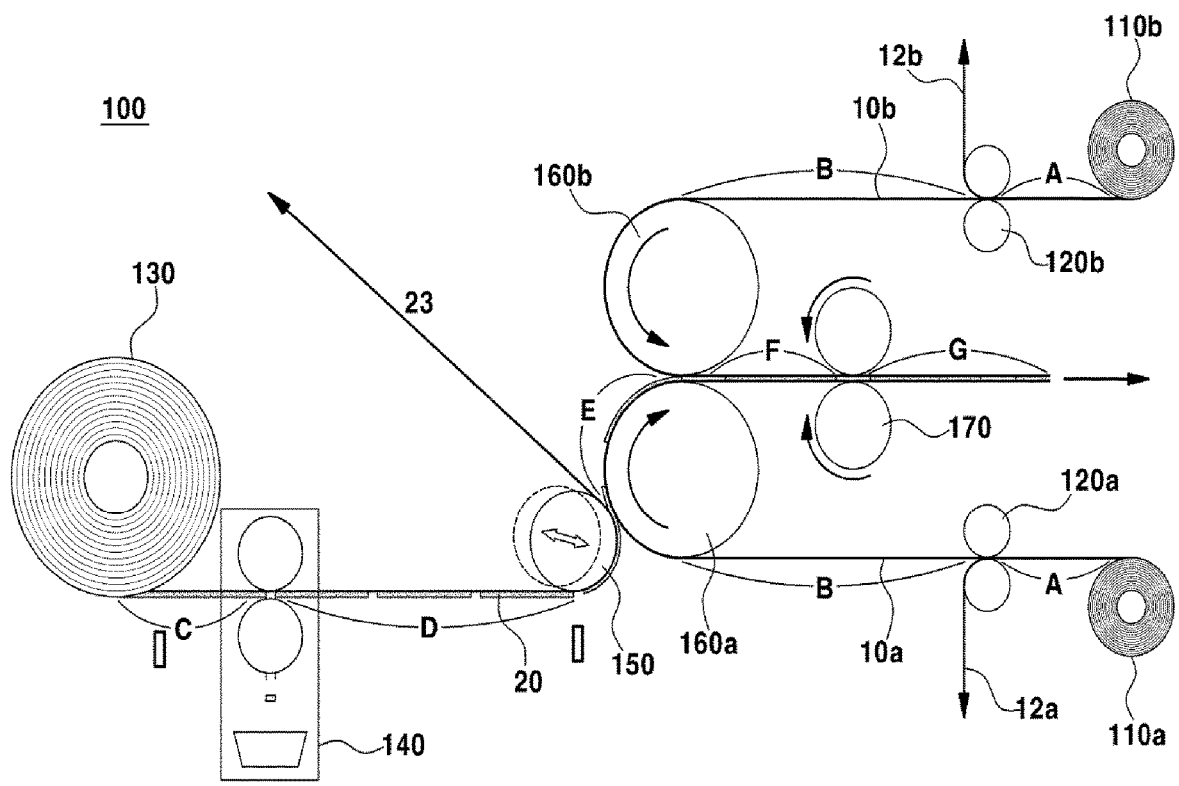
FIG. 2 is a schematic view illustrating the configuration of a membrane-electrode assembly (MEA) manufacturing apparatus used in a method for manufacturing a membrane-electrode assembly (MEA) according to one exemplary embodiment of the present disclosure.

FIG. 2 is a schematic view illustrating the configuration of a membrane-electrode assembly (MEA) manufacturing apparatus used in a method for manufacturing a membrane-electrode assembly (MEA) according to one exemplary embodiment of the present disclosure. Notably, the manufacturing method may be executed by a controller operated various robotic features of the apparatus. Referring to FIG. 2, a manufacturing apparatus 100 used in the method for manufacturing the membrane-electrode assembly (MEA) may include a first sub-gasket sheet unwinder 110a, a second sub-gasket sheet unwinder 110b, a first sub-gasket cutter 120a, a second sub-gasket cutter 120b, an electrode membrane sheet unwinder 130, an electrode membrane cutter 140, an electrode membrane sheet bonding roller 150, a first sub-gasket sheet bonding roller 160a, a second sub-gasket sheet bonding roller 160b, and step-preventive reinforced bonding rollers 170.

Figure 3A:
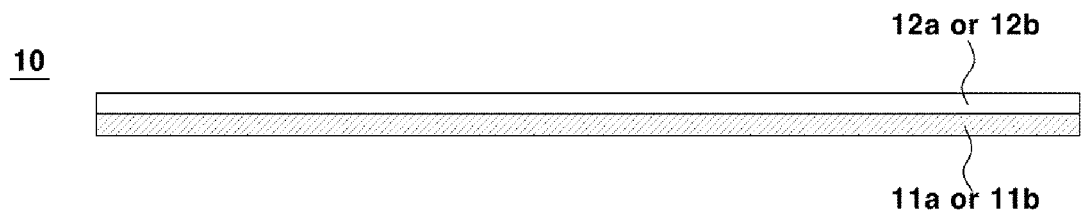
FIGS. 3A to 3F are cross-sectional views schematically illustrating structures included in sections A to F in the flow direction of a process for manufacturing the membrane-electrode assembly (MEA) according to one exemplary embodiment of the present disclosure.

The first sub-gasket sheet unwinder 110a, the second sub-gasket sheet unwinder 110b, the first sub-gasket cutter 120a and the second sub-gasket cutter 120b may be operated at the same speed to continuously perform a process. A first sub-gasket sheet 10a may be formed by attaching a first sub-gasket 11a to the surface of a protective film 12a. The detailed structure of the first sub-gasket sheet 10a in section A is illustrated in FIG. 3A. The first sub-gasket sheet 10a may be wound into a roll on the first sub-gasket sheet unwinder 110a, and the first sub-gasket sheet unwinder 110a may be configured to unwind and continuously supply the first sub-gasket sheet 10a in the flow direction of the process.

Figure 3B:
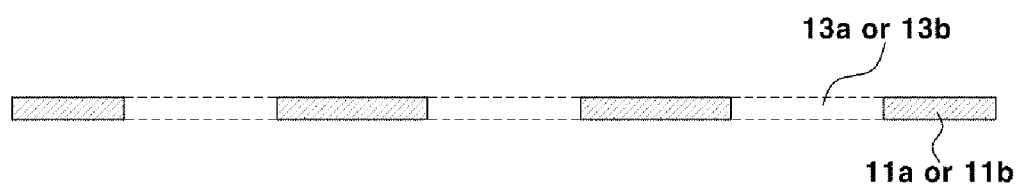

The first sub-gasket cutter 120a may be disposed at one side of the first sub-gasket sheet unwinder 110a in the flow direction of the process, and continuously form electrode windows 13a in the first sub-gasket sheet 10a to space the electrode windows 13b apart from one another by a predetermined interval. In particular, referring to FIG. 2, the protective film 12a included in the first gasket sheet 10a may be removed through the first sub-gasket cutter 120a. The first sub-gasket sheet 10a in which the electrode windows 13a are continuously formed may be supplied to the first sub-gasket sheet bonding roller 160a. The first sub-gasket sheet 10a supplied to the first sub-gasket sheet bonding roller 160a in section B is illustrated in FIG. 3B.

A second sub-gasket sheet 10b may be formed by attaching a second sub-gasket 11b to the surface of a protective film 12b. The detailed structure of the second sub-gasket sheet 10b in section A is illustrated in FIG. 3A. The second sub-gasket sheet 10b may be wound into a roll on the second sub-gasket sheet unwinder 110b, and the second sub-gasket sheet unwinder 110b may be configured to unwind and continuously supply the second sub-gasket sheet 10b in the flow direction of the process.

The second sub-gasket cutter 120b may be disposed at one side of the second sub-gasket sheet unwinder 110b in the flow direction of the process, and continuously form electrode windows 13b in the second sub-gasket sheet 10b to space the electrode windows 13b apart from one another by a predetermined interval. In particular, referring to FIG. 2, the protective film 12b included in the second gasket sheet 10b may be removed through the second sub-gasket cutter 120b. The second sub-gasket sheet 10b in which the electrode windows 13b are continuously formed may be supplied to the second sub-gasket sheet bonding roller 160b. The second sub-gasket sheet 10b supplied to the second sub-gasket sheet bonding roller 160b in section B is illustrated in FIG. 3B.

Figure 3C:
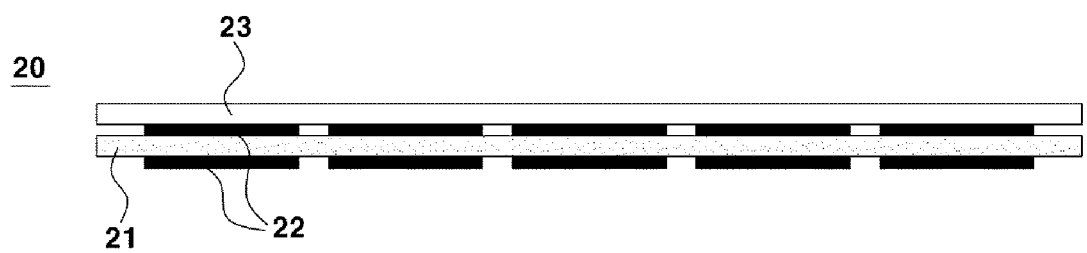

An electrode membrane sheet 20 may include an electrolyte membrane 21, electrode catalyst layers 22 formed on central portions of a first surface of the electrolyte membrane 21 and a second surface of the electrolyte membrane 21, and a protective film 23 disposed on the outer surface of one of the electrode catalyst layers 22. The detailed structure of the electrode membrane sheet 20 in section C is illustrated in FIG. 3C. The electrode membrane sheet 20 may be wound into a roll on the electrode membrane sheet unwinder 130, and the electrode membrane sheet unwinder 130 may be configured to unwind and discontinuously (using stop-go method) supply the electrode membrane sheet 20 in the flow direction of the process. The electrode membrane cutter 140 may be disposed at one side of the electrode membrane sheet unwinder 130 in the flow direction of the process, and may be configured to continuously form gaps 24 in the electrode membrane sheet 20 to space the gaps 24 apart from one another by a predetermined interval.

Figure 4A:
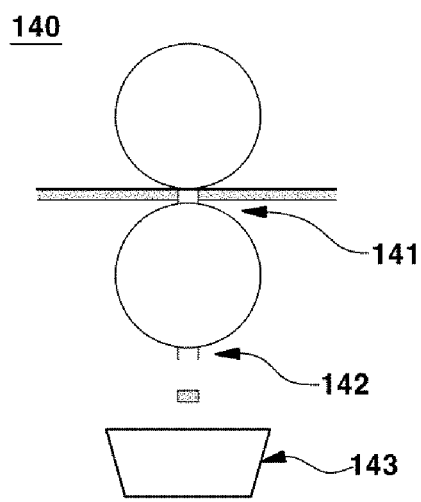
FIG. 4A is a cross-sectional view schematically illustrating an electrode membrane cutter included in the membrane-electrode assembly (MEA) manufacturing apparatus according to one exemplary embodiment of the present disclosure.

FIG. 4A is a cross-sectional view schematically illustrating a detailed process in which the electrode membrane cutter 140 included in the membrane-electrode assembly (MEA) manufacturing apparatus according to one exemplary embodiment of the present disclosure continuously forms the gaps 24. Referring to FIG. 4A, the electrode membrane cutter 140 may include punching rollers 141 that contact the electrode membrane sheet 20, a blower 142 formed under the punching rollers 141, and a collector 142 disposed below the punching rollers 141 outside the blower 142.

In particular, formation of the gaps 24 may include separating some portions of the electrolyte membrane 21 through suction to form the gaps 24 by performing a punching process through the punching rollers 141 included in the electrode membrane cutter 140, removing the separated portions of the electrolyte membrane 21 using the blower 142, and collecting the removed portions of the electrolyte membrane 21 in the collector 143.

Figure 4B:
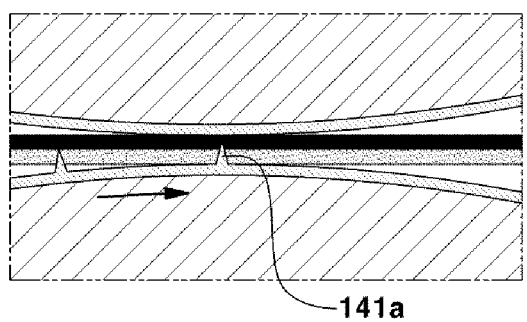
FIG. 4B is a cross-sectional view schematically illustrating a punching plate included in punching rollers included in the electrode membrane cutter according to one exemplary embodiment of the present disclosure.

FIG. 4B is a cross-sectional view schematically illustrating the punching plate 141a included in the punching rollers 141. Referring to FIG. 4B, the punching plate 141a included in the punching rollers 141 may have any depth corresponding to the thickness to which the electrolyte membrane 21 may be punched, without being limited thereto, and the punching plate 141a may particularly have a depth in the range of the thickness of the electrolyte membrane 21 to the sum of the thickness of the electrolyte membrane 21 and the thickness of the protective film 23, and more particularly have a minimum depth corresponding to the thickness of the electrolyte membrane 21+3 µm to ensure stability in punching and a maximum depth corresponding to the sum of the thickness of the electrolyte membrane 21 and the thickness of the protective film 23−3 µm to ensure stability in transferring and to prevent cutting. In particular, the thickness of the electrolyte membrane 21 may be about 5-50 µm. When the thickness of the electrolyte membrane 21 is less than about 5 µm, durability may be poor or deteriorated, and when the thickness of the electrolyte membrane 21 exceeds about 50 µm, performance of the electrolyte membrane 21 may be unsatisfactory.

Further, the thickness of the protective film 23 may be about 10-200 µm. When the thickness of the protective film 23 is less than about 10 µm, disadvantages in processing may be caused by drawing of the protective film 23 due to drawing and punching tolerances of the protective film 23 caused by tension, and when the thickness of the protective film 23 exceeds about 200 µm, equipment durability and workability may be reduced due to increase in the weight of the protective film 23 to be wound. Consequently, the depth of the punching plate 141a included in the punching rollers 141 may be about 15-250 µm, particularly about 18-247 µm. When the depth of the punching plate 141a is less than about 15 µm, processability and product durability may be reduced, and when the depth of the punching plate 141a exceeds about 250 µm, workability may be reduced and a material for the punching plate 141a may be overused.

The electrode membrane sheet bonding roller 150 may be disposed at one side of the electrode membrane cutter 140 in the flow direction of the process, and the electrode membrane sheet 20 having the gaps 24 formed therein may be supplied from the electrode membrane cutter 140 to the electrode membrane sheet bonding roller 150 continuously or discontinuously. Particularly, the electrode membrane sheet 20 may be discontinuously supplied to the electrode membrane sheet bonding roller 150 based on a first bonding operation which will be described below.

Particularly, the electrode membrane sheet 20 may be discontinuously supplied to the electrode membrane sheet bonding roller 150 only when the first bonding operation is operated in a state in which the electrode membrane sheet 20 and the first sub-gasket sheet 10a pass between the first sub-gasket sheet bonding roller 160a and the electrode membrane sheet bonding roller 150 while the electrode membrane sheet 20 contacts the electrode window 13a of the first sub-gasket sheet 10a. Further, to discontinuously supply the electrode membrane sheet 20 and to reduce the amount of the electrolyte membrane 21 used therethrough, the electrode membrane sheet bonding roller 150 may fluidly change the position thereof within a particular range.

Accordingly, by discontinuously supplying the electrode membrane sheet 20 having the gaps 24 formed therein so that the amount of the electrolyte membrane 21 used is reduced while continuously supplying the first sub-gasket sheet 10a and the second sub-gasket sheet 10b, a membrane electrode assembly (MEA) in which the minimum length of the electrolyte membrane 21 protrudes between sub-gaskets and the electrolyte membrane 21 together with the electrode catalyst layers 22 is bonded to the sub-gaskets may be manufactured.

Figure 3D:
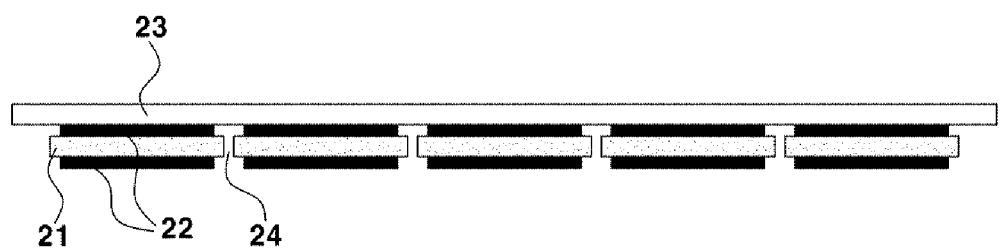

FIG. 3D is a detailed cross-sectional view of the electrode membrane sheet 20 supplied to the electrode membrane sheet bonding roller 150. Referring to FIG. 3D, the electrode membrane sheet 20 in section D includes the gaps 24 formed therein. The gap 24 may be a space between one end of the electrolyte membrane 21, which is included in the electrode membrane sheet 20 and is formed through the punching process, and a corresponding end of the adjacent electrolyte membrane 21. The gaps 24 may be about 2-34 mm.

When the gaps 24 are less than about 2 mm, punched regions are not ensured during the punching process, and when the gaps 24 exceed about 34 mm, a greater amount of the electrolyte membrane 21 than is needed is consumed and the amount of the electrolyte membrane that is saved is reduced. The first sub-gasket sheet bonding roller 160a may be disposed at one side of the first sub-gasket cutter 120a in the flow direction of the process, and particularly, the first sub-gasket sheet bonding roller 160a and the electrode membrane sheet bonding roller 150 may be disposed=to contact each other.

FIGS. 5A to 5D are enlarged structural views illustrating a first bonding process in which the electrode membrane sheet supplied from the electrode membrane sheet bonding roller and the first sub-gasket sheet continuously supplied from the first sub-gasket sheet bonding roller are bonded. First, referring to FIG. 5A, operation of the electrode membrane sheet bonding roller 150 configured to supply the electrode membrane sheet 20 may be stopped when the electrode membrane sheet 20 contacts the first sub-gasket 11a included in the first sub-gasket sheet 10a.

Figure 5A:
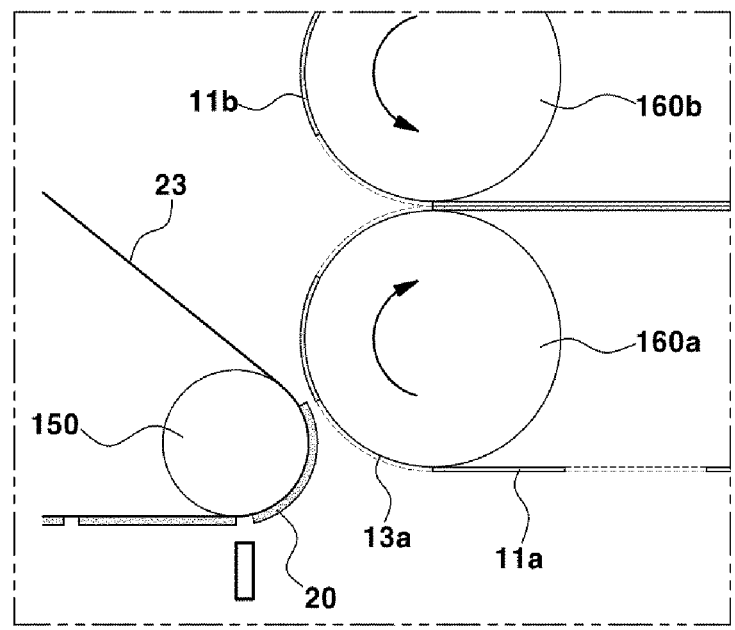
FIGS. 5A to 5D are enlarged structural views illustrating a first bonding process in which an electrode membrane sheet supplied from an electrode membrane sheet bonding roller and a first sub-gasket sheet supplied from a first sub-gasket sheet bonding roller according to one exemplary embodiment of the present disclosure are bonded.
Figure 5B:
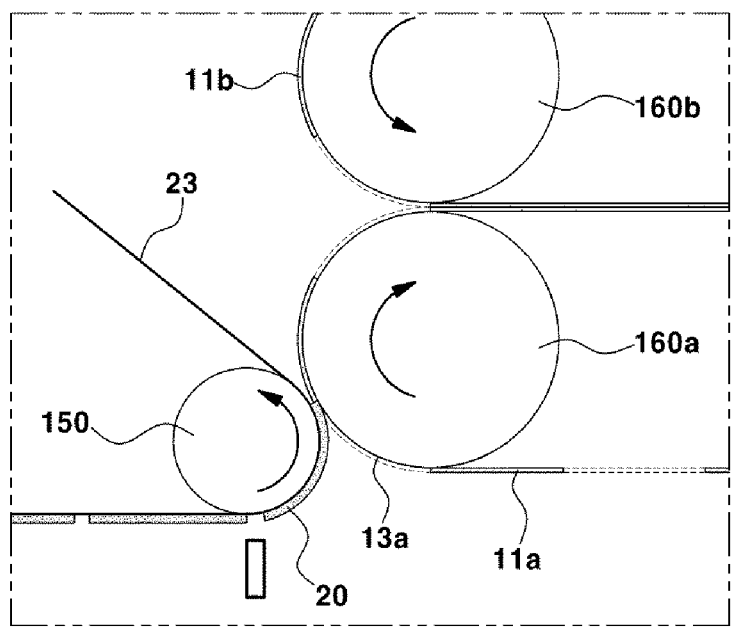
Figure 5C:
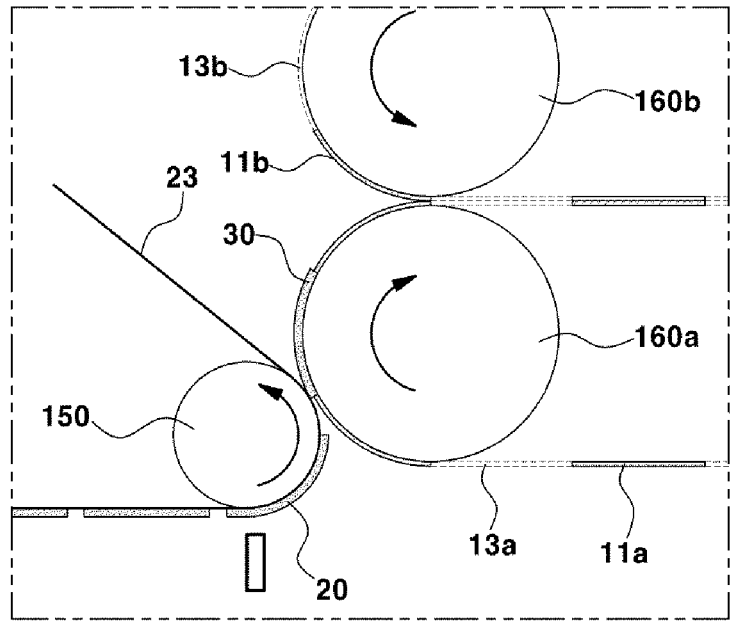

Referring to FIG. 5B, when the electrode membrane sheet 20 contacts the electrode window 13a included in the first sub-gasket sheet 10a continuously supplied from the first sub-gasket sheet bonding roller 160a, the electrode membrane sheet bonding roller 150 may begin to be operated together with the first sub-gasket sheet bonding roller 160a which is continuously operated, and thus, the first bonding operation in which the electrode membrane sheet 20 and the first sub-gasket sheet 10a are bonded may be started. In other words, the electrode membrane sheet bonding roller 150 may be discontinuously operated only when the electrode membrane sheet 20 contacts the electrode window 13a.

The electrode membrane sheet bonding roller 150 and the first sub-gasket sheet bonding roller 160a may be hot rollers. Therefore, referring to FIG. 5C, the first bonding operation, in which thermocompression bonding between the electrode membrane sheet 20 and the first sub-gasket sheet 11a is performed through the electrode membrane sheet bonding roller 150 and the first sub-gasket sheet bonding roller 160a, may be performed. In particular, the thermocompression bonding temperature may be about 10-200° C., particularly about 100° C. or less. When the thermocompression bonding temperature exceeds about 100° C., processability is reduced due to thermoplasticity of the electrolyte membrane 21, and when the thermocompression bonding temperature exceeds about 200° C., performance of the electrolyte membrane 21 is deteriorated.

Figure 3E:
Figure 5D:
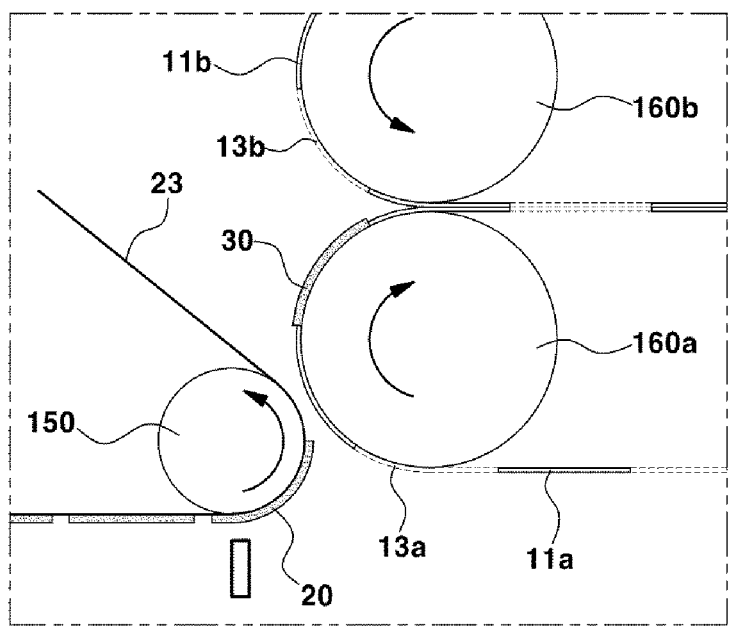

Thereafter, the first bonding operation may be performed until a contact region between the electrode membrane sheet 20 and the electrode window 13a of the first sub-gasket sheet 10a is terminated. Referring to FIG. 5D, when the contact region between the electrode membrane sheet 20 and the electrode window 13a of the first sub-gasket sheet 10a is terminated, the electrode membrane sheet 20 may contact the first sub-gasket 11a included in the first sub-gasket sheet 10a, and thus, the electrode membrane sheet bonding roller 150 may be returned to an original position thereof and operation of the electrode membrane sheet bonding roller 150 may be stopped. In particular, the protective film 23 included in the electrode membrane sheet 20 may be removed from the electrode membrane sheet 20. Further, the first sub-gasket sheet bonding roller 160a may be configured to continuously supply a first assembly 30 manufactured after the first bonding operation to the second sub-gasket sheet bonding roller 160b. FIG. 3E is a cross-sectional view of the first assembly 30 in section E.

Figure 6:
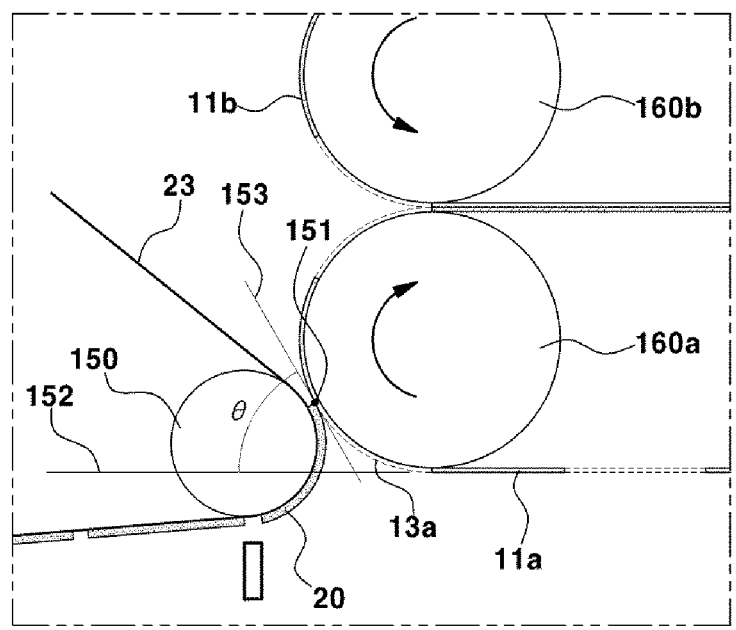
FIG. 6 is an enlarged structural view illustrating a bonding position between the electrode membrane sheet bonding roller and the first sub-gasket sheet bonding roller according to one exemplary embodiment of the present disclosure.

FIG. 6 is an enlarged structural view illustrating a bonding position between the electrode membrane sheet bonding roller and the first sub-gasket sheet bonding roller according to one exemplary embodiment of the present disclosure. Referring to this figure, the electrode membrane sheet bonding roller 150 may be operated such that, when the first bonding operation is performed through contact between the electrode membrane sheet 20 and the electrode window 13a included in the first sub-gasket sheet 10a, the electrode membrane sheet bonding roller 150 may be configured to perform rotational motion at a contact point 151 at which the electrode membrane sheet 20 contacts the first sub-gasket sheet bonding roller 160a, and then perform linear motion at a point at which the electrode membrane sheet 20 does not contact the first sub-gasket sheet bonding roller 160a.

The electrode membrane sheet bonding roller 150 and the first sub-gasket sheet bonding roller 160a may be disposed at positions such that an angle θ formed by a straight line 153 including the contact point 151, at which the electrode membrane sheet bonding roller 150 performs the rotational motion, and a straight line 152 on a path of the linear motion is 0-90°, and particularly, to minimize a change in pressure of a second bonding operation which is performed between the first sub-gasket sheet bonding roller 160a and the second sub-gasket sheet bonding roller 160b simultaneously with the first bonding operation. The simultaneous operation may be executed by applying physical impact to the first sub-gasket sheet bonding roller 160a due to a tolerance of the linear motion when the electrode membrane sheet bonding roller 150 contacts the first sub-gasket sheet bonding roller 160a. The angle θ between the straight line 151 includes the contact point 151 at which the electrode membrane sheet bonding roller 150 performs the rotational motion and the straight line 152 including the point at which the electrode membrane sheet bonding roller 150 performs the rotational motion may be 0°.

Further, the weight of the electrode membrane sheet bonding roller 150 may be less than or greater than the weight of the first sub-gasket sheet bonding roller 160a, and particularly, to minimize the change in pressure of the second bonding operation which is performed between the first sub-gasket sheet bonding roller 160a and the second sub-gasket sheet bonding roller 160b simultaneously with the first bonding operation by applying physical impact to the first sub-gasket sheet bonding roller 160a due to the tolerance of the linear motion when the electrode membrane sheet bonding roller 150 contacts the first sub-gasket sheet bonding roller 160a, the weight of the electrode membrane sheet bonding roller 150 may be less than the first sub-gasket sheet bonding roller 160a. The second sub-gasket sheet bonding roller 160b may be disposed on the first sub-gasket sheet bonding roller 160a, and particularly, the second sub-gasket sheet bonding roller 160b may be disposed on the first sub-gasket sheet bonding roller 160a to be in contact with each other.

The first assembly, which is continuously supplied from the first sub-gasket sheet roller 160a after the first bonding operation, and the second sub-gasket sheet 10b, which is continuously supplied from the second sub-gasket sheet bonding roller 160b, may pass between the first sub-gasket sheet roller 160a and the second sub-gasket sheet roller 160b and may thus be secondarily bonded, thereby being capable of preparing a second assembly. The first sub-gasket sheet bonding roller 160a and the second sub-gasket sheet boding roller 160b may be hot rollers. Therefore, the second bonding operation, in which thermocompression bonding between the first sub-gasket sheet 10a and the second sub-gasket sheet 10b is performed through the first sub-gasket sheet bonding roller 160a and the second sub-gasket sheet bonding roller 160b, may be performed.

Figure 3F:
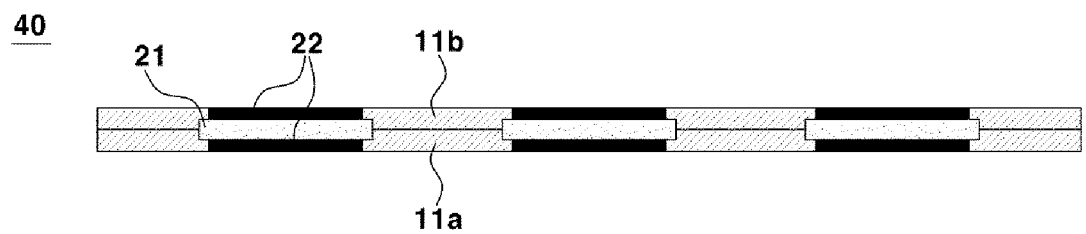

Particularly, the thermocompression bonding temperature may be about 10-200° C., particularly 100° C. or less. When the thermocompression bonding temperature exceeds about 100° C., processability is reduced due to thermoplasticity of the electrolyte membrane 21, and when the thermocompression bonding temperature exceeds about 200° C., performance of the electrolyte membrane 21 is deteriorated. Thereafter, the second bonding operation may use a bonding method which is generally used in the art to which the present disclosure pertains, particularly a whole surface bonding method. FIG. 3F is a cross-sectional view of the second assembly included in section F.

Referring to FIG. 2, the step-preventive reinforced bonding rollers 170 may be disposed at one side of each of the first sub-gasket sheet roller 160a and the second sub-gasket sheet roller 160b in the flow direction of the process after the second bonding operation. The second assembly which is continuously supplied from the first and second sub-gasket sheet rollers 160a and 160b after the second bonding operation may pass between the step-preventive reinforced bonding rollers 170 and thus thirdly bonded, thereby being capable of manufacturing a membrane-electrode assembly (MEA). Such a third bonding operation may use a bonding method which is generally used in the art to which the present disclosure pertains, particularly a reinforced bonding method.

Figure 7A:
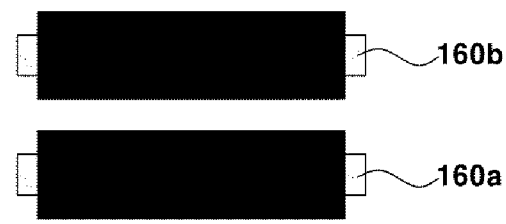
FIG. 7A is a cross-sectional view illustrating the first sub-gasket sheet bonding roller and a second sub-gasket sheet bonding roller in accordance with one exemplary embodiment of the present disclosure.
Figure 7B:
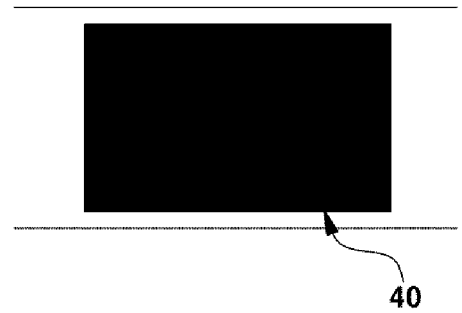
FIG. 7B is a front view of a second assembly according to one exemplary embodiment of the present disclosure.
Figure 7C:
FIG. 7C is a cross-sectional view illustrating step-preventive reinforced bonding rollers which press stepped portions, formed because the electrode membrane sheet is shorter than the sub-gasket sheet, in the second assembly according to one exemplary embodiment of the present disclosure.
Figure 7D:
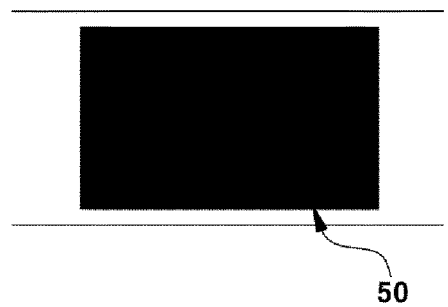
FIG. 7D is a front view of the membrane-electrode assembly (MEA) included in section G according to one exemplary embodiment of the present disclosure.

FIG. 7C is a cross-sectional view illustrating the step-preventive reinforced bonding rollers, and FIG. 7D is a front view of the membrane-electrode assembly (MEA) after the reinforced bonding operation. Referring to these figures, stepped portions may be formed in the second assembly due to a difference between materials in respective positions due to reduction in the amount of the electrolyte membrane 21 used. Therefore, to prevent formation of the stepped portions in the second assembly, the step-preventive reinforced bonding rollers 170 may be disposed at outer regions in the transverse direction relative to the progress direction of the second assembly during the third bonding operation.

Figure 8A:
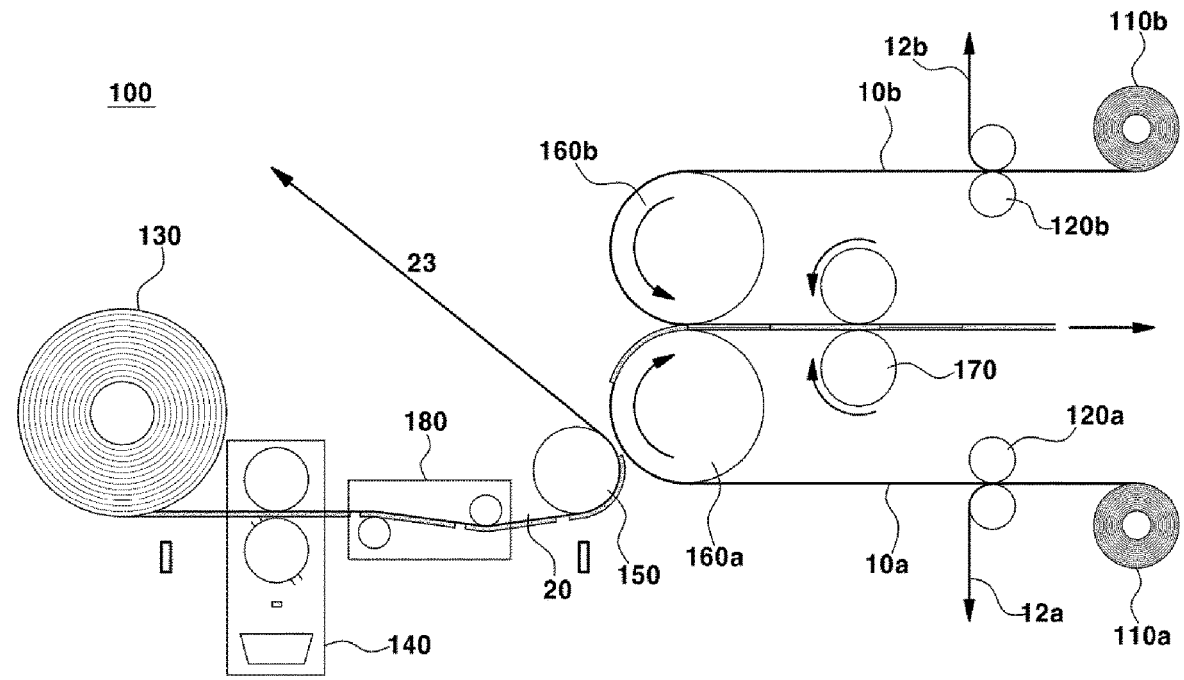
FIGS. 8A and 8B are structural views schematically illustrating buffer rollers which are additionally included in the manufacturing apparatus used in the method for manufacturing the membrane-electrode assembly (MEA) according to one exemplary embodiment of the present disclosure.
Figure 8B:
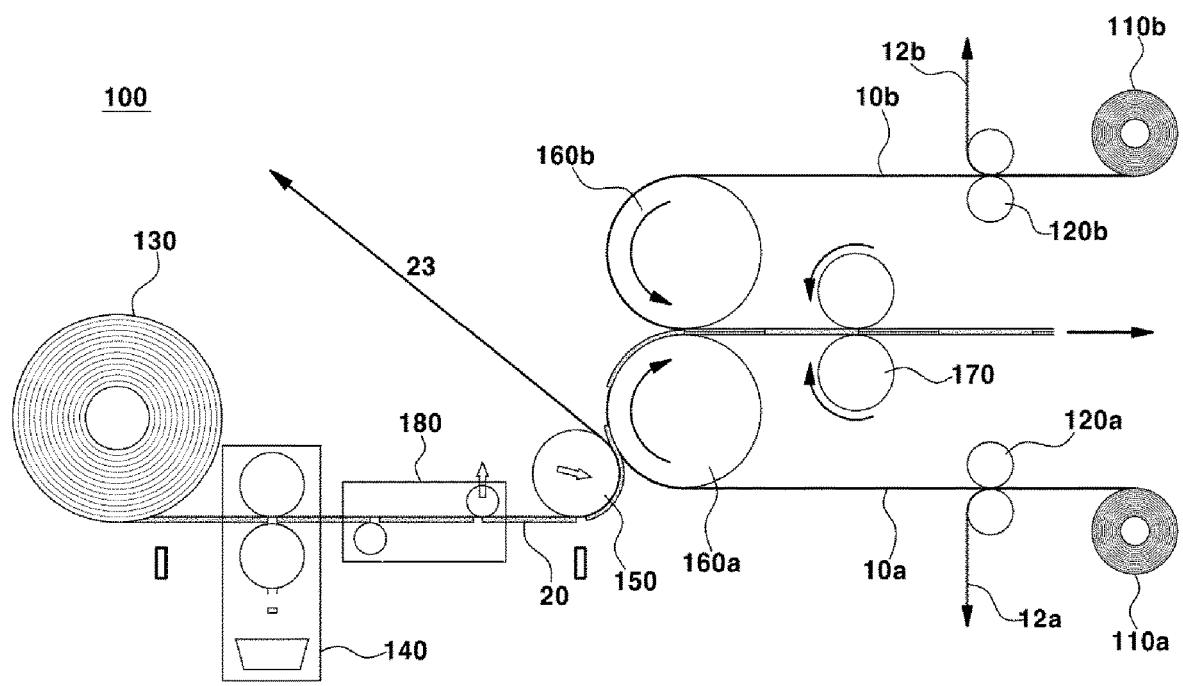
Figure 9:
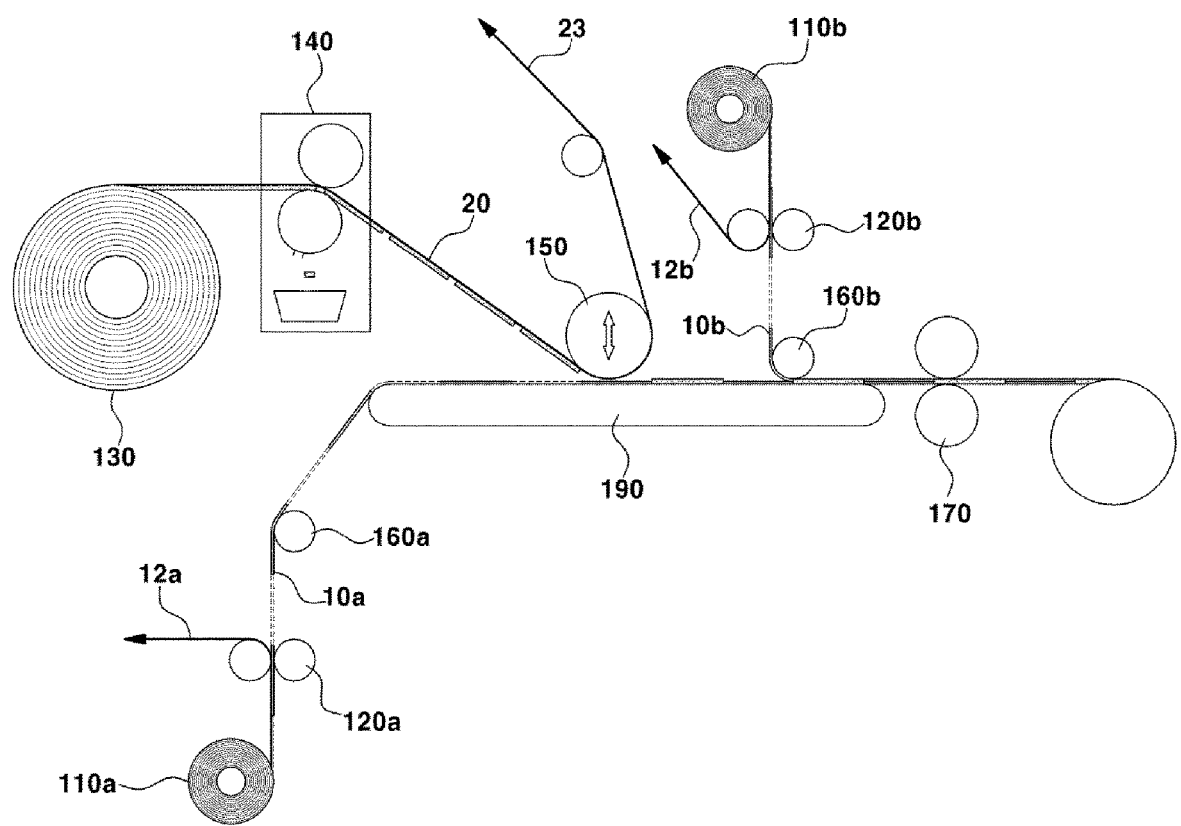
FIG. 9 is a structural view schematically illustrating a vacuum conveyer which is additionally included in the manufacturing apparatus used in the method for manufacturing the membrane-electrode assembly (MEA) according to one exemplary embodiment of the present disclosure.

FIGS. 8A and 8B are structural views schematically illustrating buffer rollers which are additionally included in the manufacturing apparatus used in the method for manufacturing the membrane-electrode assembly (MEA) according to one exemplary embodiment of the present disclosure. Referring to these figures, the manufacturing apparatus 100 used in the method for manufacturing the membrane-electrode assembly (MEA) may further include buffer rollers 180, and the buffer rollers 180 may perform a motion which offsets path deviation of the linear motion.

The buffer rollers 180 may be disposed between the electrode membrane cutter 140 and the electrode membrane sheet bonding roller 150. The electrode membrane sheet bonding roller 150 may be configured to perform the linear motion at the point at which the electrode membrane sheet 20 does not contact the first sub-gasket sheet bonding roller 160a. In particular, the electrode membrane sheet bonding roller 150 may fluidly change the position thereof within the particular range and the electrode membrane sheet 20 may be configured to perform linear motion between the electrode membrane sheet bonding roller 150, the position of which is changed, and the electrode membrane cutter 140.

In other words, path deviation may occur in the linear motion of the electrode membrane sheet 20 between the electrode membrane sheet bonding roller 150 and the electrode membrane cutter 140. When the process is performed in the state in which the buffer rollers 180 are disposed between the electrode membrane sheet bonding roller 150 and the electrode membrane cutter 140, as shown in FIGS. 8A and 8B, the buffer rollers 180 may be configured to perform motion which offsets the path deviation in the linear motion. Accordingly, the probability of drawing deformations of the electrolyte membrane 21 and defective products due to a path difference may be reduced.

The manufacturing apparatus used in the method for manufacturing the membrane-electrode assembly (MEA) according to one exemplary embodiment of the present disclosure may be any manufacturing apparatus capable of being used to execute the method, without being limited thereto. For example, the manufacturing apparatus may have a structure in which the electrode membrane sheet bonding roller 150, the first sub-gasket sheet bonding roller 160a and the second sub-gasket sheet bonding roller 160b are adjacently connected to one another, as shown in FIG. 2, or be configured such that the first sub-gasket sheet 10a supplied from the first sub-gasket sheet bonding roller 160a is transferred to a vacuum conveyer belt and primarily bonded to the electrode membrane sheet 20 supplied from the electrode membrane sheet bonding roller 150 to prepare a first assembly. The first assembly may be conveyed and thermally compressed in the progress direction of the vacuum conveyer belt, to which heat is applied, and then may be secondarily bonded to the second sub-gasket sheet 10b supplied from the second sub-gasket sheet bonding roller 160b to prepare a second assembly. Thereafter, subsequent operations may be equal to or different from the above-described method.

Hereinafter, the present disclosure will be described in more detail through the following examples. However, the examples merely illustrate the disclosure, and are not intended to limit the scope of the disclosure.

Example—Manufacture of MEA by Method According to Present Invention

As shown in FIGS. 8A and 8B, the manufacturing apparatus may further include the buffer rollers 180 in addition to the manufacturing apparatus used in the method for manufacturing the membrane-electrode assembly (MEA) according to one exemplary embodiment of the present disclosure was used.

Materials and specifications which were used are as follows. A commercial film material, such as PI, PET, PEN, etc., and an epoxy-based adhesive were used to prepare a first sub-gasket sheet 10a and a second sub-gasket sheet 10b.

Specifications according to NEXO produced by Hyundai Motor Company were used to prepare electrode catalyst layers 22 and an electrolyte membrane 21. Further, the depth of the punching plate 141a included in the punching rollers 141 was 20 μm. In addition, gaps in an electrode membrane sheet 20 prepared by the punching rollers 141 were 20 mm.

Further, the thermocompression bonding temperature between the electrode membrane sheet 20 and the first sub-gasket sheet 10a through the electrode membrane sheet bonding roller 150 and the first sub-gasket sheet bonding roller 160a was 60-110° C., and the thermocompression bonding temperature between the first sub-gasket sheet 10a and the second sub-gasket sheet 10b through the first sub-gasket sheet bonding roller 160a and the second sub-gasket sheet bonding roller 160b was 60-110° C. Accordingly, a membrane-electrode assembly (MEA) in which the amount of the electrolyte membrane 21 used is reduced was manufactured.

Comparative Example—Manufacture of MEA

A commercial film material, such as PI, PET, PEN, etc., and an epoxy-based adhesive were used to prepare a first sub-gasket sheet 10a and a second sub-gasket sheet 10b. Specifications according to NEXO produced by Hyundai Motor Company were used to prepare electrode catalyst layers 22 and an electrolyte membrane 21. For comparison, the electrolyte membrane 21 was applied to the entirety of sub-gaskets in addition to portions around electrodes.

Test Example—Verification of Airtightness and Performance of MEA

Figure 10:
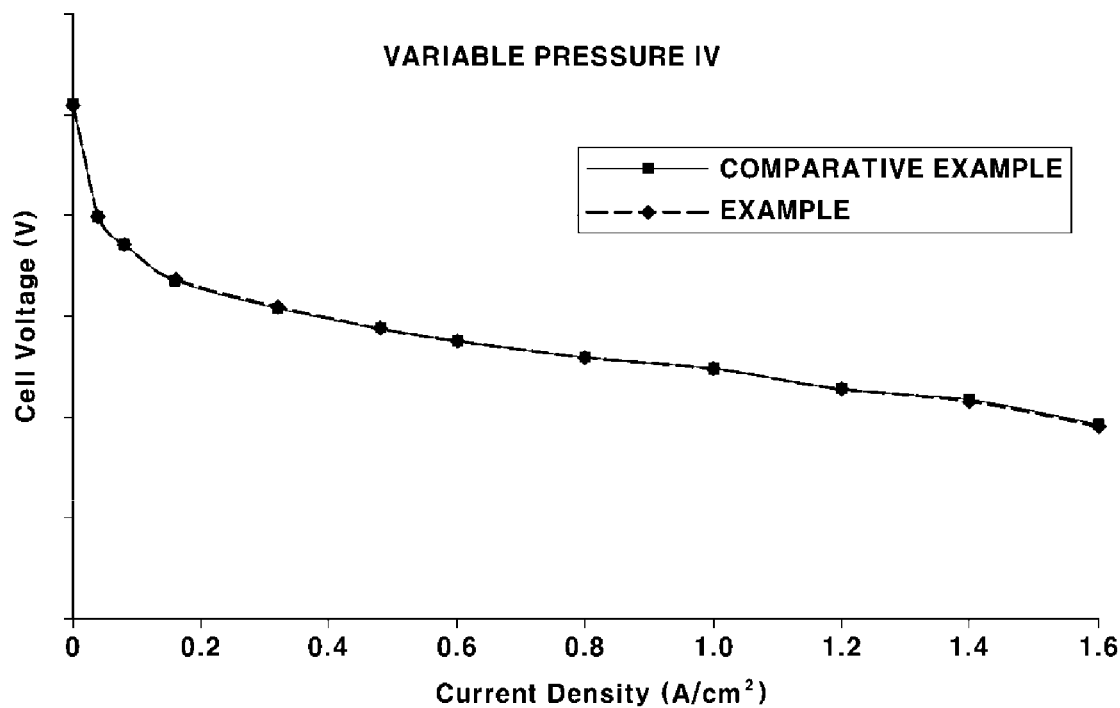
FIG. 10 is a graph representing results of performance (durability) evaluation of an MEA manufactured in an example of the present disclosure and an MEA manufactured in a comparative example under a variable pressure condition.
Figure 11:
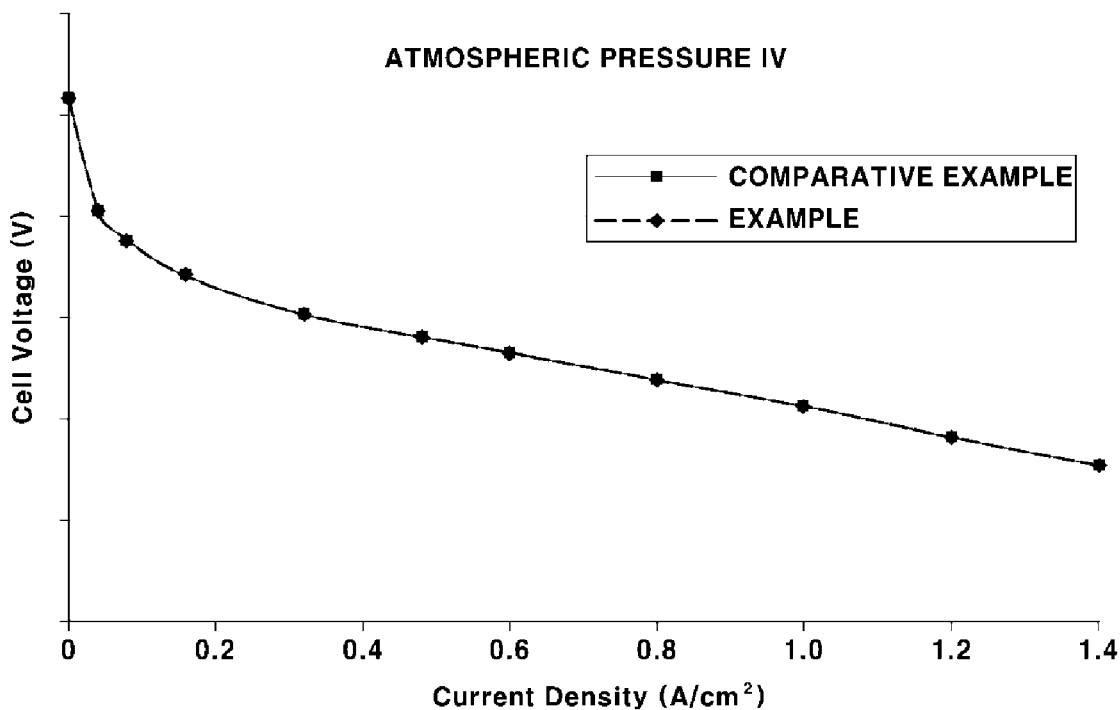
FIG. 11 is a graph representing results of performance (durability) evaluation of the MEA manufactured in the example of the present disclosure and the MEA manufactured in the comparative example under a normal condition.

The membrane-electrode assemblies (MEAs) manufactured in the example and the comparative example were evaluated using the following methods, and evaluation results are set forth in Table 1 and FIGS. 10 and 11.

Evaluation Methods
1. Verification of Airtightness: After a pressure based on criteria set by the present inventors was applied, a decrease in the pressure was measured for a particular time.
2. Verification of Performance: Under the condition that fixed quantities of air/hydrogen based on criteria set by the present inventors were applied, voltage was measured at a particular current density.

Referring to Table 1, as airtightness verification results, the MEA manufactured in the example of the present disclosure has an airtightness level equal to the MEA manufactured in the comparative example.

Further, as performance verification results, it may be confirmed that the MEA manufactured in the example of the present disclosure has performance (durability) equal to the MEA manufactured in the comparative example under a variable pressure condition and an atmospheric pressure condition, as shown in Table 1 and FIGS. 10 and 11. Additionally, it may be confirmed that the MEA manufactured in the example of the present disclosure has performance (durability) equal to the MEA manufactured in the comparative example under a low temperature condition and a high temperature condition, and the MEA manufactured in the example of the present disclosure causes no bonding surface abnormality under a room temperature condition.

Therefore, in the membrane-electrode assembly (MEA) manufactured according to the present disclosure, the minimum length of the electrolyte membrane protrudes between sub-gaskets, and the electrolyte membrane together with the electrode catalyst layers is bonded to the sub-gaskets, and thus, t membrane-electrode assembly (MEA) may minimize the electrolyte membrane present in non-electricity-generating regions and have performance equal to a conventional membrane-electrode assembly (MEA).

As is apparent from the above description, in a method for manufacturing a membrane-electrode assembly (MEA) in which a roll-to-roll method and a stop-go method are combined, first and second sub-gasket sheets may be continuously supplied and an electrode membrane sheet having gaps formed therein so that the amount of an electrolyte membrane used is reduced may be supplied discontinuously, and thus, the minimum length of the electrolyte membrane protrudes between sub-gaskets, and the electrolyte membrane together with electrode catalyst layers may be bonded to the sub-gaskets, and therefore, the amount of the electrolyte membrane used in non-electricity-generating regions may be reduced by about 50%. Further, the electrolyte membrane may be prevented from being exposed to the edge of the MEA, and thus leakage of generated water to the outside of the MEA may be prevented.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:
1. A method for manufacturing a membrane-electrode assembly (MEA), comprising:

TABLE 1

| Division | | | Results |
|---|---|---|---|
| Verification of airtightness (mmbar) | General | Room temp. | Reactant surface: −16/Cooled surface: −6 |
| | | Low temp. | Reactant surface: −6/Cooled surface: −3 |
| | Temperature cycle | Room temp. | Reactant surface: −31/Cooled surface: −14 |
| | | Low temp. | Reactant surface: −10/Cooled surface: −5 |
| Performance (durability) | Variable pressure condition | | Equal (comparison with comparative example, −1 mV) |
| | Atmospheric pressure condition | | Equal (comparison with comparative example, −0 mV) |
| | Low temperature condition | | Equal (comparison with comparative example, −0 mV) |
| | High temperature condition | | Equal (comparison with comparative example, +3 mV) |
| | Room temperature condition | | PASS (no bonding surface abnormality) | unwinding and supplying a first sub-gasket sheet and a second sub-gasket sheet wound into rolls;

continuously forming electrode windows in the supplied first sub-gasket sheet and second sub-gasket sheet using a first sub-gasket cutter and a second sub-gasket cutter to space the electrode windows apart from one another by a predetermined interval;

continuously supplying the first sub-gasket sheet and the second sub-gasket sheet provided with the electrode windows continuously formed therein to a first sub-gasket sheet bonding roller and a second sub-gasket sheet bonding roller;

unwinding and supplying an electrode membrane sheet wound into a roll;

continuously forming gaps in the supplied electrode membrane sheet using an electrode membrane cutter to space the gaps apart from one another by a predetermined interval;

supplying the electrode membrane sheet provided with the gaps formed therein to an electrode membrane sheet bonding roller;

primarily bonding the supplied first sub-gasket sheet and the supplied electrode membrane sheet by allowing the first sub-gasket sheet and the electrode membrane sheet to pass between the first sub-gasket sheet bonding roller and the electrode membrane sheet bonding roller; and secondarily bonding a second assembly, supplied from the first sub-gasket sheet bonding roller after the primarily bonding, and the second sub-gasket sheet supplied from the second sub-gasket sheet bonding roller by allowing the second assembly and the second sub-gasket sheet to pass between the first sub-gasket sheet bonding roller and the second sub-gasket sheet bonding roller.

2. The method of claim 1, further comprising:
thirdly bonding a second assembly, supplied from the first sub-gasket sheet roller and second sub-gasket sheet roller after the secondarily bonding, by allowing the second assembly to pass between step-preventive reinforced bonding rollers.

3. The method of claim 1, wherein the electrode membrane sheet includes:
an electrolyte membrane;
electrode catalyst layers formed on central portions of a first surface and a second surface of the electrolyte membrane; and
a protective film disposed on an outer surface of one of the electrode catalyst layers.

4. The method of claim 3, wherein the protective film is removed after the primarily bonding.

5. The method of claim 1, wherein continuously forming the gaps includes:
separating some portions of the electrolyte membrane of the electrode membrane sheet to form the gaps by performing a punching process using punching rollers included in the electrode membrane cutter;
removing the separated portions of the electrolyte membrane; and
collecting the removed portions of the electrolyte membrane.

6. The method of claim 5, wherein a punching plate included in the punching rollers has a depth of about 15-250 µm.

7. The method of claim 1, wherein the gaps have a size of about 2-34 mm.

8. The method of claim 1, wherein the electrode membrane sheet provided with the gaps formed therein is supplied to the electrode membrane sheet bonding roller via a pair of buffer rollers, prior to the primarily bonding.

9. The method of claim 1, wherein, in supplying the electrode membrane sheet to the electrode membrane sheet bonding roller, the electrode membrane sheet is discontinuously supplied to the electrode membrane sheet bonding roller when the primarily bonding is performed in a state in which the electrode membrane sheet contacts the electrode window of the first sub-gasket sheet.

10. The method of claim 1, wherein the electrode membrane sheet bonding roller is operated such that the electrode membrane sheet bonding roller performs rotational motion at a contact point at which the electrode membrane sheet contacts the first sub-gasket sheet bonding roller, and then performs linear motion at a point at which the electrode membrane sheet does not contact the first sub-gasket sheet bonding roller.

11. The method of claim 10, wherein the electrode membrane sheet bonding roller and the first sub-gasket sheet bonding roller are disposed at positions such that an angle formed by a straight line comprising the contact point at which the rotational motion is performed and a straight line on a path of the linear motion is less than about 90°.

12. The method of claim 1, wherein a weight of the electrode membrane sheet bonding roller is less than a weight of the first sub-gasket sheet bonding roller.

* * * * *